(12) United States Patent
Yu

(10) Patent No.: US 10,066,596 B2
(45) Date of Patent: Sep. 4, 2018

(54) FLOAT-LINKAGE DEVICE FOR WAVE-ENERGY ELECTRICITY GENERATION

(71) Applicant: Fang-Chun Yu, New Taipei (TW)

(72) Inventor: Fang-Chun Yu, New Taipei (TW)

( * ) Notice: Subject to any disclaimer, the term of this patent is extended or adjusted under 35 U.S.C. 154(b) by 337 days.

(21) Appl. No.: 15/131,213

(22) Filed: Apr. 18, 2016

(65) Prior Publication Data

US 2017/0298897 A1    Oct. 19, 2017

(51) Int. Cl.
  *F03B 13/16*   (2006.01)
  *F03B 13/20*   (2006.01)
  *F03B 13/18*   (2006.01)

(52) U.S. Cl.
  CPC .............. *F03B 13/20* (2013.01); *F03B 13/181* (2013.01); *F05B 2240/91* (2013.01); *F05B 2240/931* (2013.01); *Y02E 10/22* (2013.01); *Y02E 10/38* (2013.01)

(58) Field of Classification Search
  CPC .... F03B 13/18; F03B 13/1805; F03B 13/181; F03B 13/1815; F03B 13/1825; F03B 13/20; F03B 13/262
  See application file for complete search history.

(56) References Cited

U.S. PATENT DOCUMENTS

| 578,612 | A | * | 3/1897 | Spangler | F03B 13/1815 417/332 |
| 1,688,032 | A | * | 10/1928 | Blair | F03B 13/1815 60/500 |
| 1,953,285 | A | * | 4/1934 | Arner | F03B 13/1815 60/498 |
| 3,259,361 | A | * | 7/1966 | Cantu | F03B 13/1815 60/505 |
| 2011/0185720 | A1 | * | 8/2011 | Hughes | F03B 13/18 60/497 |

FOREIGN PATENT DOCUMENTS

DE    102005017040 A1 * 11/2006 .......... F03B 13/1815

* cited by examiner

*Primary Examiner* — Jonathan Matthias
(74) *Attorney, Agent, or Firm* — Rosenberg, Klein & Lee

(57) ABSTRACT

A float-linkage device for wave-energy electricity generation includes a float coming with two moving braces attached to two sides thereof. The two moving braces are pivotally connected to corresponding ends of upper and lower links. The upper and lower links each have an opposite end thereof pivotally connected to a transmission link. The transmission link further has an opening for receiving a one-way bearing, thereby forming a float-link unit. A plurality of the float-link units are linked by each having a pivot hole at one end of the moving brace of the float engaged with a boom of a prop, and having a pivot hole of the one-way bearing engaged with a main boom of the prop. A gear is provided on the main boom of the prop and is engaged with a pinion provided on a power-generating device installed on the prop.

1 Claim, 4 Drawing Sheets

FLOAT-LINKAGE DEVICE FOR WAVE-ENERGY ELECTRICITY GENERATION

BACKGROUND OF THE INVENTION

Technical Field

The present invention relates to wave-energy electricity generation, and more particularly to a float-linkage device for wave-energy electricity generation.

Description of Related Art

Hydroelectric energy, solar energy, and wind energy are some known renewable solutions for electricity generation. All of these work by using natural power to drive power-generating devices and generate electricity.

However, limited by the current technical level, implementation of these solutions requires extensive land area and costly equipment. Taking wind power for example, wind farms have to be installed at spacious, windy places so that wind can drive blades of wind turbines and generate electricity. Another challenge for wind power is that the yield is unstable because the equipment is fixedly installed and wind is uncontrollable in nature. Similar problems can be seen in the cases of hydroelectric and solar power solutions.

In view of the limitations and challenges of the existing power-generating devices, the inventor of the present invention uses his expertise and years of experience to conceive a practical and effective way to generate electricity that make good use of natural resources and requires less or even no land area and fewer costs, and invents a float-linkage device for wave-energy electricity generation.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

BRIEF SUMMARY OF THE INVENTION

The present invention provides a float-linkage device for wave-energy electricity generation. The float-linkage device comprises a float coming with two moving braces attached to two sides thereof. The two moving braces each have a pivot hole at one end thereof where a pivot pin passes through and then enters pivot holes at corresponding ends of upper and lower links. The upper and lower links each have an opposite end thereof formed with a pivot hole for a pivot pin to pass therethrough. The pivot pin then passes through a pivot hole of the transmission link. The transmission link further has an opening for a one-way bearing to fit therein, thereby forming a float-link unit. Plural said float-link units are linked by each having a pivot hole at one end of the moving brace of the float engaged with a boom of a prop, and having a pivot hole of the one-way bearing in the transmission link of the float-link unit engaged with a main boom of the prop. A gear is provided at one end of the main boom of the prop and is engaged with a pinion provided on a power-generating device installed on the prop.

One objective of the present invention is that when floating on the sea by buoyancy, the floats move up and down with waves and consequently generate a push force that makes the upper and lower links expand and retract continuously, and thereby push or pull the transmission links. As a result, the one-way bearings of the two transmission links of the same float-linkage unit alternately drive the main boom of the prop to revolve, thereby making the gear drive the pinion of the power-generating device to generate power.

Another objective of the present invention is that the disclosed configuration for generating power may be fixedly installed at an offshore site, or it may be installed at two sides of a boat, so as to be easily maneuvered.

DETAILED DESCRIPTION OF THE INVENTION

Figure 1:
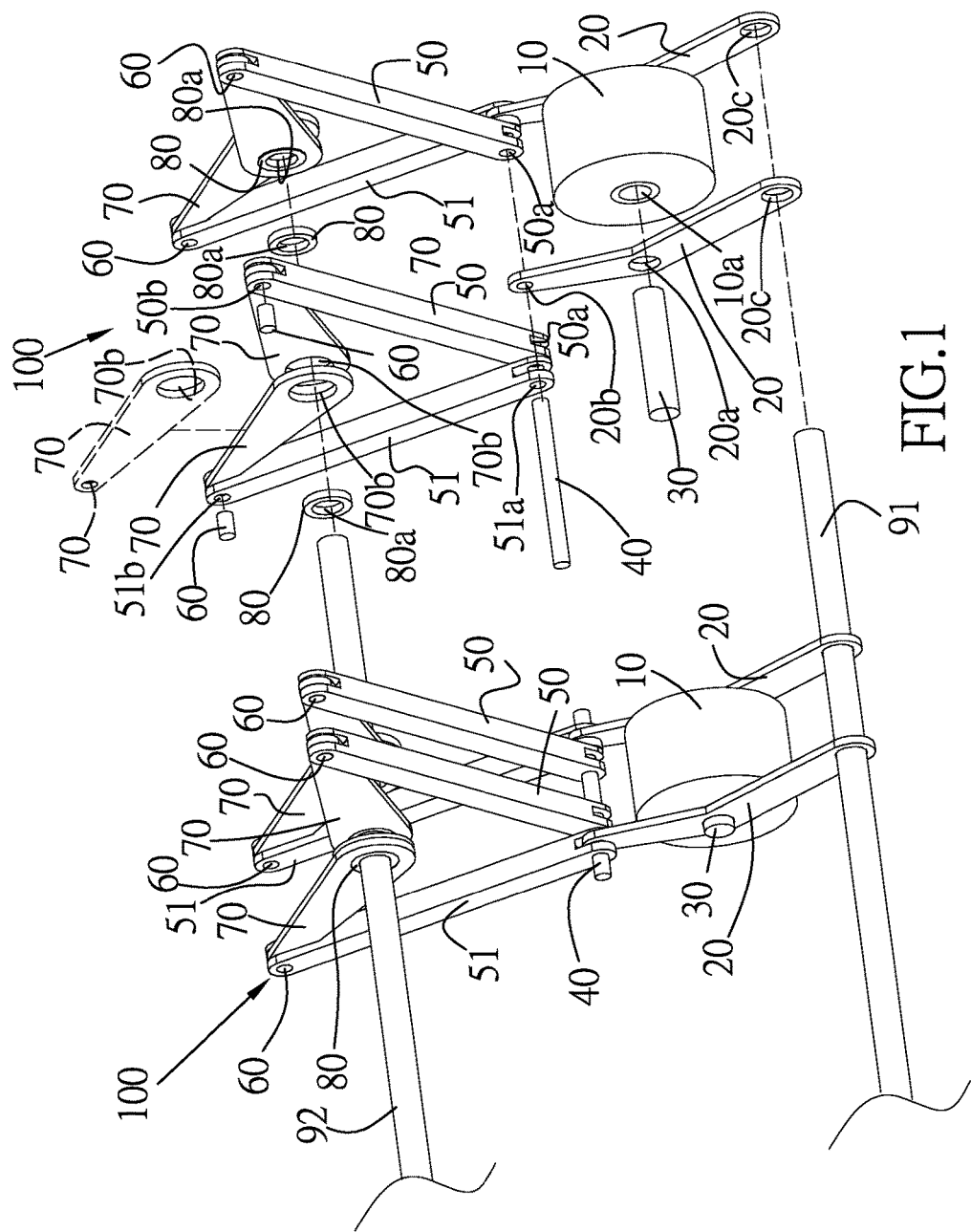
FIG. 1 is a perspective view and an exploded view of float-link units used in a float-linkage device for wave-energy electricity generation according to the present invention.

FIG. 1 is a perspective view and an exploded view of float-link units used in a float-linkage device for wave-energy electricity generation according to the present invention. As shown, each of the float-link units has a float 10 centrally formed with a through hole 10a. Two opposite sides of the float 10 each have a moving brace 20 attached thereto. The moving brace 20 has a middle pivot hole 20a aligned with the through hole 10a of the float 10, so that a pivot screw 30 inserted into the middle pivot holes 20a and the through hole 10a attaches the moving braces 20 to the float 10. The moving brace 20 has a pivot hole 20b formed at one end thereof. A pivot pin 40 passes through the pivot hole 20b of the moving brace 20 and pivot holes 50a, 51a formed at corresponding ends of an upper link 50 and of a lower link 51. At opposite corresponding ends of the upper and lower links 50, 51, there are pivot holes 50b, 51b aligned with a pivot hole 70a of a transmission link 70 so that a pivot pin 60 passes through the pivot holes 50b, 51b of the upper and lower links 50, 51 and the pivot hole 70a of the transmission link 70. The transmission link 70 further has an opening 70b for a one-way bearing 80 to fit therein. The foregoing configuration thus forms a float-link unit 100.

A plurality of the foregoing float-link units 100 (also referring to FIGS. 2, 3 and 4) are linked by each having a pivot hole 20c at one end of the moving brace 20 of the float 10 engaged with a boom 91 of a prop 90, and having a pivot hole 80a of the one-way bearing 80 in the transmission link 70 of the float-link unit 100 engaged with a main boom 92 of the prop 90. In this manner, plural said float-link units 100 are connected in series and spaced. A gear 93 is provided at one end of the main boom 92 of the prop 90 and is engaged with a pinion 94a provided on a power-generating device 94 installed on the prop 90. As such, a float-linkage device 1000 for power generation is established.

Figure 2:
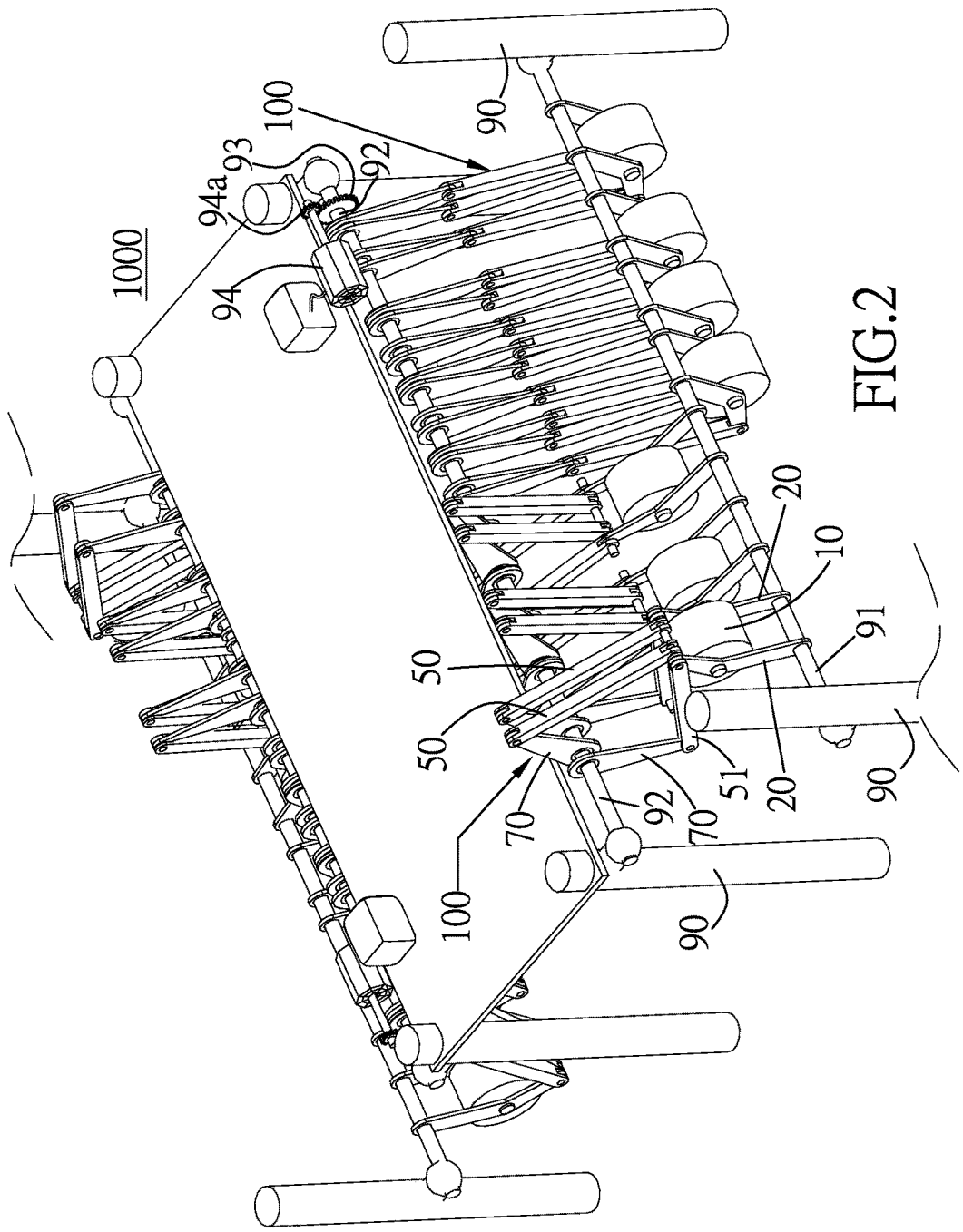
FIG. 2 is a perspective view of the float-linkage device for wave-energy electricity generation in one embodiment.
Figure 3:
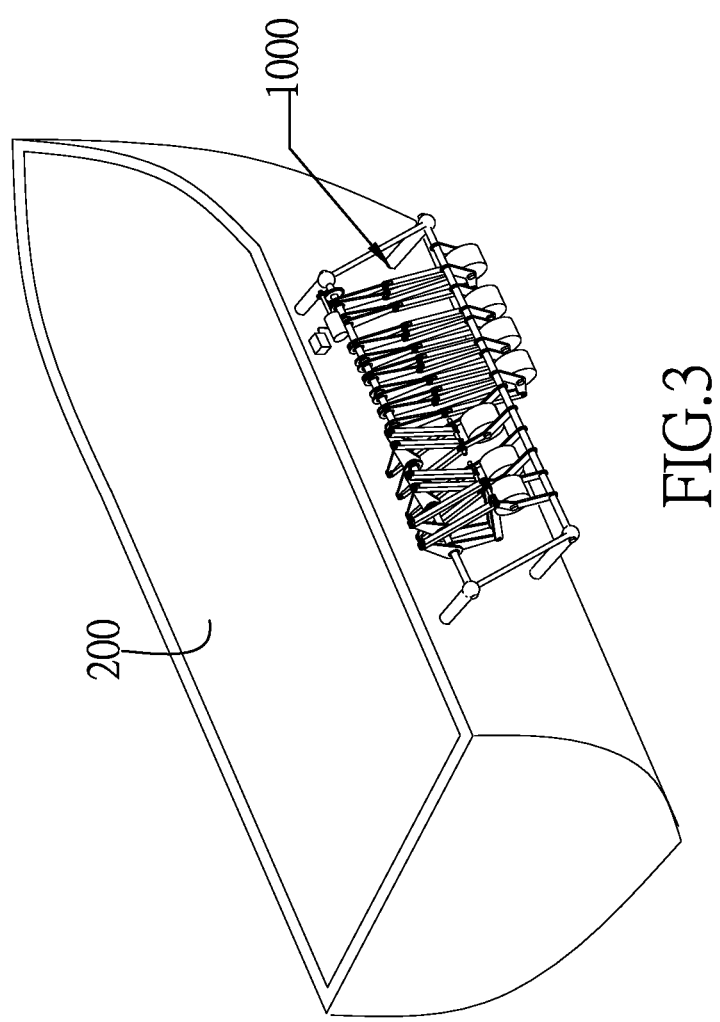
FIG. 3 is a perspective view of the float-linkage device for wave-energy electricity generation in another embodiment.

The float-linkage device 1000 may be fixedly installed at an offshore site for generating power, as shown in FIG. 2, or it may be installed at two sides of a boat 200 as FIG. 3, so as to be easily maneuvered.

Figure 4:
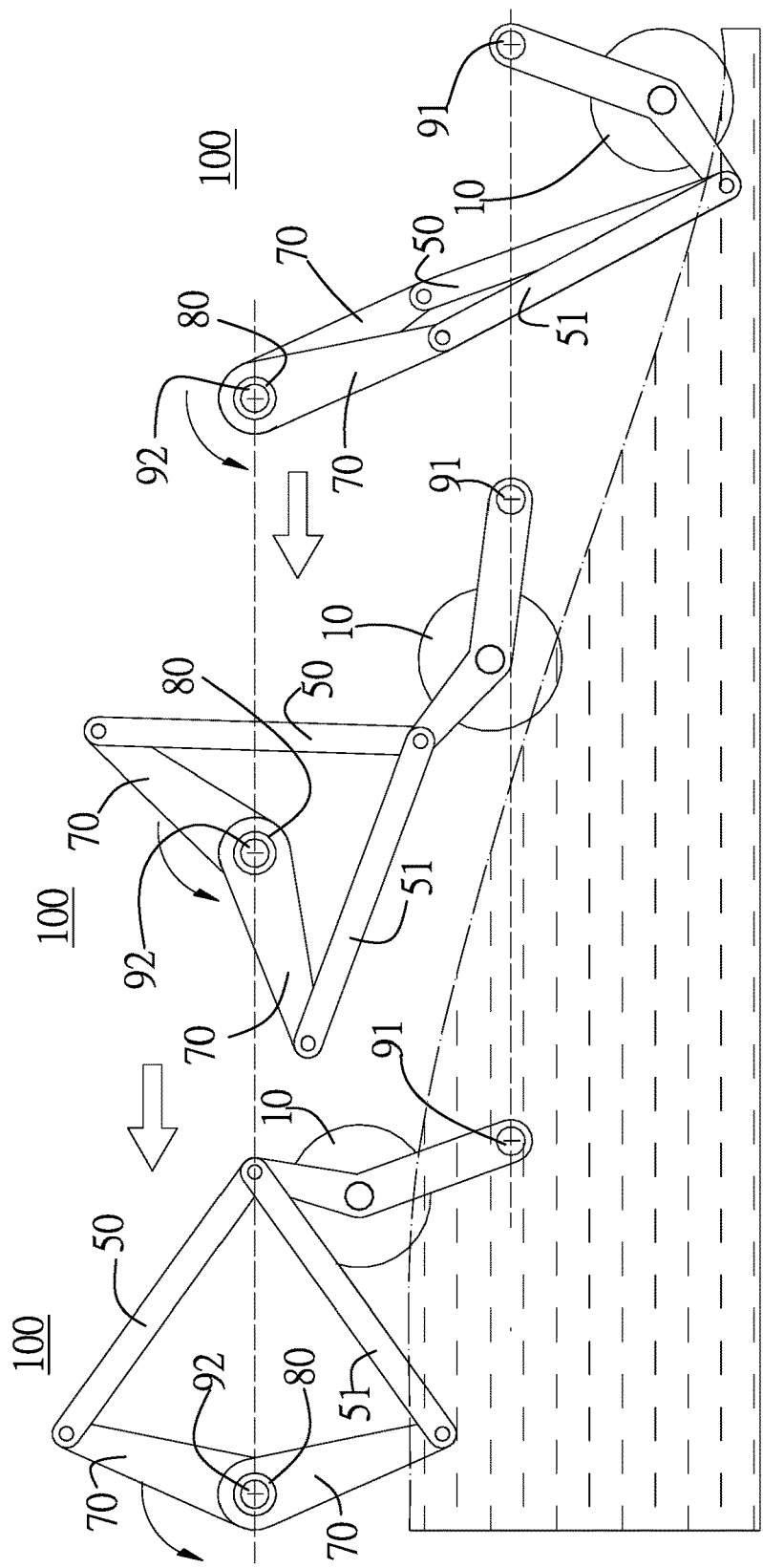
FIG. 4 is a schematic drawing showing how the float-link unit of the float-linkage device moves when hit by sea waves.

FIG. 4 is a schematic drawing showing how a float-link unit of the disclosed float-linkage device moves when hit by sea waves. As shown, when the float 10 of the float-link unit 100 floats on the sea by buoyancy, it moves up and down with waves and consequently generates a push force that makes the upper and lower links 50, 51 expand and retract continuously, and thereby push or pull the transmission links 70. As a result, the two transmission links 70 rotate in different directions and keep changing directions, and this makes the one-way bearings 80 of the two transmission links 70 to alternately drive the main boom 92 of the prop 90 to revolve, leading to continuous rotation of the main boom 92, which in turn makes the gear 93 drive the pinion 94a of the power-generating device 94 to generate electricity.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A float-linkage device for wave-energy electricity generation, comprising: a float centrally formed with a through hole, two moving braces being attached to two opposite sides of the float, the moving brace having a middle pivot hole aligned with the through hole of the float, so that a pivot screw inserted into the middle pivot holes and the through hole attaches the moving braces to the float, the moving brace having a pivot hole formed at one end thereof, a pivot pin passing through the pivot hole of the moving brace and pivot holes formed at corresponding ends of an upper link and of a lower link, pivot holes at opposite corresponding ends of the upper and lower links being aligned with a pivot hole of a transmission link so that a pivot pin passes through the pivot holes of the upper and lower links and the pivot hole of the transmission link, and the transmission link further having an opening for a one-way bearing to fit therein, thereby forming a float-link unit;

a plurality of said float-link units being linked by each having a pivot hole at one end of the moving brace of the float engaged with a boom of a prop, and having a pivot hole of the one-way bearing in the transmission link of the float-link unit engaged with a main boom of the prop, so that plural said float-link units are connected in series and spaced, wherein a gear is provided at one end of the main boom of the prop and is engaged with a pinion provided on a power-generating device installed on the prop, thereby forming the float-linkage device;

whereby, when floating on the sea by buoyancy, the floats of the float-link units move up and down with waves and consequently generate a push force that makes the upper and lower links expand and retract continuously, and thereby push or pull the transmission links, as a result, two said transmission links of the same float-linkage unit rotating in different directions and keeping changing directions, in turn making the one-way bearings of the two transmission links to alternately drive the main boom of the prop to revolve, leading to continuous rotation of the main boom, which in turn makes the gear drive the pinion of the power-generating device to generate electricity.

* * * * *